(12) United States Patent
De et al.

(10) Patent No.: US 12,718,003 B2
(45) Date of Patent: Aug. 25, 2026

(54) PERSONALIZED COMMUNICATION TEXT COMPRESSION SYSTEM

(71) Applicant: Microsoft Technology Licensing, LLC, Redmond, WA (US)

(72) Inventors: Titas De, Kolkata (IN); Amartya Chaudhuri, Bangalore (IN); Kushal Ghosh, Bangalore (IN); Kumar Abhishek, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 262 days.

(21) Appl. No.: 18/288,544

(22) PCT Filed: May 5, 2022

(86) PCT No.: PCT/US2022/027740
§ 371 (c)(1),
(2) Date: Oct. 26, 2023

(87) PCT Pub. No.: WO2022/250909
PCT Pub. Date: Dec. 1, 2022

(65) Prior Publication Data

US 2024/0211682 A1 Jun. 27, 2024

(30) Foreign Application Priority Data

May 28, 2021 (IN) ............................. 202141023934

(51) Int. Cl.
*G06F 40/00* (2020.01)
*G06F 40/166* (2020.01)
*G06N 5/04* (2023.01)

(52) U.S. Cl.
CPC ............ *G06F 40/166* (2020.01); *G06N 5/04* (2013.01)

(58) Field of Classification Search
CPC ................................ G06F 40/166; G06N 5/04
See application file for complete search history.

(56) References Cited

U.S. PATENT DOCUMENTS 10,628,474 B2 4/2020 Modani et al.
10,834,127 B1 * 11/2020 Yeh ...................... G06N 3/0475
(Continued)

FOREIGN PATENT DOCUMENTS

WO 0219069 A2 3/2002
WO 2017096147 A1 6/2017

OTHER PUBLICATIONS

"Azure AI Language", Retrieved From: https://azure.microsoft.com/en-in/products/ai-services/ai-language#overview, Retrieved On: Jun. 21, 2020, 9 Pages.

(Continued)

*Primary Examiner* — William L Bashore
*Assistant Examiner* — David Faber
(74) *Attorney, Agent, or Firm* — Schwegman Lundberg & Woessner, P.A.

(57) ABSTRACT

Email clients typically store received email in a local device to allow faster retrieval of the email. There is a need to optimize the space for emails stored locally without sacrificing the ability to work in an offline mode. Emails for users are summarized and the summarized version of the email is stored on the local device without storing the original email. An electronic device receives an email that is summarized and provided to the user in a way that is easily digestible and saves storage space. A machine learning model is trained by the user to provide the user with a summarized version of the email. A baseline machine learning model is provided to a user and over time, based on user interactions that train the baseline machine learning model, a personalized machine (Continued)

learning model is generated to predict and provide summaries that are beneficial to the user.

13 Claims, 8 Drawing Sheets

(56) References Cited

U.S. PATENT DOCUMENTS

| | | | | |
|---|---|---|---|---|
| 10,885,436 | B1 | 1/2021 | Saleh et al. | |
| 2006/0074883 | A1 | 4/2006 | Teevan et al. | |
| 2008/0281922 | A1 | 11/2008 | Renshaw et al. | |
| 2008/0281927 | A1* | 11/2008 | Vanderwende | G06F 40/258 709/206 |
| 2012/0197630 | A1 | 8/2012 | Lyons et al. | |
| 2014/0222834 | A1 | 8/2014 | Parikh et al. | |
| 2015/0052084 | A1* | 2/2015 | Kolluru | G06T 13/40 706/11 |
| 2016/0241499 | A1* | 8/2016 | Hailpern | G06Q 10/107 |
| 2017/0124034 | A1 | 5/2017 | Upadhyay et al. | |
| 2018/0011931 | A1 | 1/2018 | Modani et al. | |
| 2018/0039889 | A1* | 2/2018 | Nanavati | G06F 16/387 |
| 2018/0048595 | A1 | 2/2018 | Dotan-cohen et al. | |
| 2018/0157628 | A1* | 6/2018 | Hollingsworth | G06F 40/151 |
| 2018/0232127 | A1 | 8/2018 | Sharifi et al. | |
| 2018/0239495 | A1 | 8/2018 | Sharifi et al. | |
| 2019/0042551 | A1 | 2/2019 | Hwang | |
| 2019/0052586 | A1 | 2/2019 | Oliver et al. | |
| 2019/0325066 | A1 | 10/2019 | Krishna | |
| 2020/0034433 | A1* | 1/2020 | Cassidy | G06F 21/32 |
| 2020/0202171 | A1 | 6/2020 | Hughes et al. | |
| 2020/0226216 | A1 | 7/2020 | Marin et al. | |
| 2020/0233926 | A1* | 7/2020 | Ghatak | G06Q 10/107 |
| 2020/0311122 | A1* | 10/2020 | Ramamurthy | G06N 3/08 |
| 2020/0311611 | A1* | 10/2020 | Kennedy | G06N 20/20 |
| 2020/0396191 | A1 | 12/2020 | Yang | |
| 2021/0042391 | A1 | 2/2021 | Gehrmann | |
| 2021/0056571 | A1* | 2/2021 | Su | G06Q 30/0201 |
| 2022/0318485 | A1* | 10/2022 | Narayanan | G06F 40/205 |
| 2023/0370410 | A1* | 11/2023 | Griesbach | H04L 51/216 |

OTHER PUBLICATIONS

"How to Create A Summary Of A Document In Word 2007", Retrieved From: https://www.youtube.com/watch?v=o30nPCgdq0I, Jun. 28, 2010, 4 Pages.

"Incorporating user feedback in a ML model", Retrieved From: https://web.archive.org/web/20180302093235/https://stackoverflow.com/questions/36068292/incorporating-user-feedback-in-a-ml-model, Mar. 2, 2018, 2 Pages.

"Learning to Rank", Retrieved From: https://en.wikipedia.org/w/index.php?title=Learning_to_rank&oldid=999882862, Jan. 12, 2021, 12 Pages.

Aberdeen, et al., "The Learning Behind Gmail Priority Inbox", Retrieved From: https://web.archive.org/web/20210628162017/http://static.googleusercontent.com/media/research.google.com/en//pubs/archive/36955.pdf, Jun. 28, 2021, 4 Pages.

Ayodele, et al., "Email Classification and Summarization: A Machine Learning Approach", In Proceedings of IET Conference on Wireless, Mobile and Sensor Networks, Dec. 12, 2007, 4 Pages.

"Full Post vs Summary (Excerpt) in WordPress Archive Pages?", Retrieved From: https://www.wpbeginner.com/opinion/full-post-vs-summary-excerpt-in-your-wordpress-archive/, Oct. 18, 2022, 24 Pages.

Brownlee, Jason, "Encoder-Decoder Models for Text Summarization in Keras", Retrieved From: https://machinelearningmastery.com/encoder-decoder-models-text-summarization-keras/, Aug. 7, 2019, 47 Pages.

"What is Personalizer?", Retrieved From: https://learn.microsoft.com/en-us/azure/ai-services/personalizer/what-is-personalizer, Jul. 18, 2023, 6 Pages.

Dandekar, Nikhil, "Intuitive explanation of Learning to Rank (and RankNet, LambdaRank and LambdaMART)", Retrieved From: https://medium.com/@nikhilbd/intuitive-explanation-of-learning-to-rank-and-ranknet-lambdarank-and-lambdamart-fe1e17fac418, Jan. 14, 2016, 9 Pages.

Eugene, et al., "Making a Manageable Email Experience with Deep Learning", In Journal of Stan-ford University, 2017, 8 Pages.

Khandelwal, Renu, "Simple Text Summarizer using NLP", Retrieved From: https://medium.datadriveninvestor.com/simple-text-summarizer-using-nlp-d8aaf5828e68, May 30, 2019, 9 Pages.

P.V.S, et al., "Joint Optimization of User-desired Content in Multi-document Summaries by Learning from User Feedback", In Proceedings of the 55th Annual Meeting of the Association for Computational Linguistics (vol. 1: Long Papers), Jul. 30, 2017, pp. 1353-1363.

Pai, Aravindpai, "Comprehensive Guide to Text Summarization using Deep Learning in Python", Retrieved From: https://www.analyticsvidhya.com/blog/2019/06/comprehensive-guide-text-summarization-using-deep-learning-python/, May 15, 2023, 20 Pages.

"International Search Report and Written Opinion Issued in PCT Application No. PCT/US22/027740", Mailed Date: Jul. 21, 2022, Jul. 21, 2022, 15 Pages.

Rosset, Corby, "Turing-NLG: A 17-Billion-Parameter Language Model by Microsoft", Retrieved From: https://www.microsoft.com/en-us/research/blog/turing-nlg-a-17-billion-parameter-language-model-by-microsoft/, Feb. 13, 2020, 9 Pages.

Yang, et al., "Personalized Text Content Summarizer for Mobile Learning: An Automatic Text Summarization System with Relevance Based Language Model", In Proceedings of Fourth International Conference on Technology for Education, Jul. 18, 2012, pp. 90-97.

Yoo, Shinjae, "Machine Learning Methods for Personalized Email Prioritization", Thesis Submitted in partial fulfillment of the requirements for the degree of Doctor of Philosophy in Language and Information Technologies, Jun. 10, 2010, 85 Pages.

First Examination Report received for Indian Application No. 202141023934, mailed on Jun. 17, 2026, 13 Pages.

* cited by examiner

PERSONALIZED COMMUNICATION TEXT COMPRESSION SYSTEM

CLAIM OF PRIORITY

This application is a U.S. National Stage Filing under 35 U.S.C. 371 of International Patent Application Serial No. PCT/US2022/027740, filed May 5, 2022, and published as WO 2022/250909 A1 on Dec. 1, 2022, which claims the benefit of priority to India patent application No. 202141023934, filed May 28, 2021, which applications and publication are incorporated herein by reference in their entirety.

The present disclosure generally refers to generating and utilizing a personalized communication text compression system in accordance with some examples.

BACKGROUND

Communication through the internet has become an increasingly common and popular mode of communicating between two or more people. The internet and the availability of various messaging, email, and chat applications have made web-based communication a preferred method of communicating. An added benefit of web-based communication is low cost, low latency, and high efficiency.

Emails have become a commonplace method of sending and receiving information. However, emails have become frequently used that it becomes cumbersome and exhausting to read and understand each received email.

Typically, users receive anywhere from ten to a few hundred emails per day. The sheer amount of time and effort required to open, read, review, and respond to each email can become overwhelming. Additionally, each email takes up precious memory on electronic devices. For example, a typical professional in a corporate setting may receive upwards of three hundred emails per day. Each email that is not read, stored, and deleted takes up space on the professional's desktop, laptop, cell phone, or other electronic devices. Over time, emails can clutter up inboxes, fill up memory, and cause degradation to hardware.

SUMMARY

A personalized compression system provides a technical solution to the technical problems associated with receiving high volumes of emails. This technical solution including the personalized compression system solves the technical problem of optimizing device storage and improving network bandwidth by providing a machine learning model that adapts to user's preferences that allow for a faster offline experience and anticipates a user's needs with regards to email messages and attachments to optimally store summaries of emails rather than the entire message.

In some examples, a method for creating a personalized compression system includes receiving, at a client, a first writing and extracting features from the first writing into hash values. The client is further configured to generate, with a baseline machine learning model stored on the client, a plurality of summaries (e.g., at least two summaries) for the first writing. Each summary of the plurality of summaries has a different length (e.g., compression rate). The client causes display of at least one summary of the plurality of summaries at the client and receives, from a user of the client, an indication of a selection based on the displayed at summaries. The client is further configured to refine the baseline machine learning model based on the hash values and the selected summary to generate a personalized machine learning model.

In some examples, the method includes receiving a second writing at the client and generating a summary for the second writing with the personalized machine learning model. The summary of the second writing has a length of the selected summary from the first writing. The client deletes the second writing from memory on the client device and displays the generated summary for the second writing. It is understood that a set of summaries, or a plurality of summaries, is a non-zero number of summaries.

BRIEF DESCRIPTION OF THE DRAWINGS

To easily identify the discussion of any particular element or act, the most significant digit or digits in a reference number refer to the figure number in which that element is first introduced.

Various ones of the appended drawings merely illustrate example examples of the present inventive subject matter and cannot be considered as limiting its scope.

DETAILED DESCRIPTION

Figure 1:
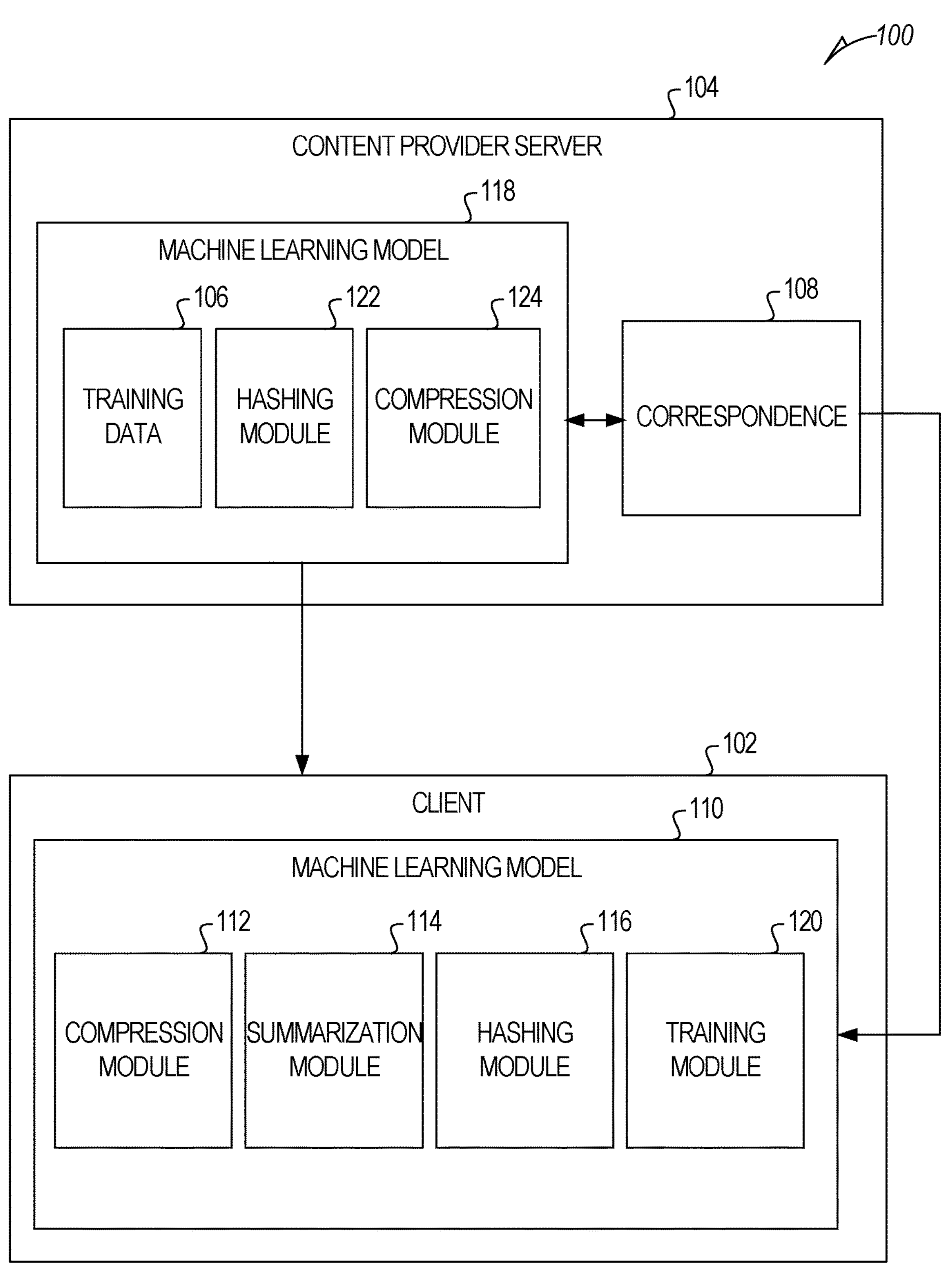
FIG. 1 illustrates a block diagram of an example computer system providing personalized email compression system in accordance with some examples.

Users typically receive too many emails in their inbox, more than they can reasonably review. Most of the time, the email client (e.g., Microsoft Outlook) stores the received email in a local device to allow faster retrieval of the email and to enable the user to view/manipulate the email in an offline mode or in low network areas. A technical problem exists in optimizing the space for emails stored locally without sacrificing the ability to work in an offline mode. Among other things, the inventors have invented a technical solution to address this technical problem. Emails for users may be summarized and the summarized version of the email is stored on the local device without storing the original email. For example, a tool (e.g., machine learning model integrated into Microsoft Outlook) stored on an electronic device receives an email. The received email is summarized and provided to the user in a way that is easily digestible and saves storage space on the device at which it is being displayed. A machine learning model is trained to provide the user with a summarized version of the email preferable by the user. Initially, a baseline machine learning model is provided to a user. Over time, based on user interactions that train the baseline machine learning model, a personalized machine learning model is generated to predict and provide summaries that are beneficial to the user. Alternatively, the machine learning model may also display the summarized version of the email as a preview and provide the full extent of the received email when a user wishes to review the entire email.

To generate a personalized machine learning model, the baseline machine learning model is trained for each user based on the user's activity. When a user receives an email, the machine learning model is configured to summarize the email in varying degrees into a set or a plurality of summaries. The plurality of summaries can include two or more summaries of varying lengths. A user is displayed the summaries and optionally the received email for visual comparison. In some examples, the compression factor (e.g., 20%, 30%) is displayed above the respective summary to allow the user to make an informed choice. In some examples, the user is shown five choices: two versions of the summarized email, the original version, the option to select more options including additional summaries, or an indication the user is satisfied and does not wish for more summaries. The process for generating the personalized machine learning model iterates until the user signifies that the user is satisfied. The algorithm (e.g., machine learning model) continues to learn and adapt to each user's preferences based on the user's activity. Additionally, various versions of the personalized machine learning model may be stored on different devices of the user. For example, a user owns a cell phone and a laptop device. Both of the cell phone and the laptop devices are configured to receive and respond to emails. However, based on the limited real estate of the cell phone display, the personalized machine learning model stored at the cell phone device may be configured to provide heavily compressed summaries, whereas the laptop device may be configured to provide moderately compressed summaries. Further, a client may be a virtual client configured to operate in a cloud-based client/server computing environment.

In some examples, high priority emails and otherwise important emails may not warrant summarization and be stored locally on the device. The learning algorithm is configured to detect when the user may not want such high priority and important emails to be compressed. This technical solution solves the technical problem of optimizing device storage and improving network bandwidth by providing a machine learning model that adapts to user's preferences that allow for a faster offline experience and anticipates a user's needs with regards to email messages and attachments to optimally store summaries of emails rather than the entire message. By using a personalized machine learning model that anticipates a user's needs, the likelihood of the user needing to access the entire original email, which requires the email to be downloaded, is reduced, thereby saving memory and network bandwidth.

In some other examples, the communication server may train the baseline machine learning model using a machine-learning technique to recognize which types of emails to summarize and provide for a user. In one example, the baseline machine learning model is trained with a plurality of emails (e.g., 1000) from various users of an email client. Examples of machine-learning techniques include Linear Regression, Logistic Regression, Classification and Regression Trees (CART), Naïve Bayes, k-Nearest Neighbor (KNN), Apriori, k-means, Principal Component Analysis (PCA), Bagging with Random Forests, Convolutional Neural Network (CNN), and other such machine-learning techniques. For example, the baseline machine learning model is a logistic regression algorithm trained using inputs of an email's features, hash values, and user interactions. Hash buckets may be used to log a number of incoming emails that are hashed and to reduce noise. If there are only a few emails that fall within a bucket, the emails will not necessarily be used for updating the machine learning model as the number of entries are not high enough to warrant training or updating the model. FIG. 1 illustrates a block diagram of an example computer system providing a personalized email compression system in accordance with some examples. System 100 provides personalized content for display to a client 102 (e.g., user device, virtual machine, virtual client) from a content provider server 104 including various subsystems (also referred to as modules).

The content provider server 104 includes a machine learning model 118 with inputs from training data module 106, and hashing module 122. In some examples, training data module 106 may include email data from multiple users and the data is used to train machine learning model 118. For example, emails from all users of an email platform (e.g., Microsoft Outlook) may be aggregated and used as training data for training the machine learning model 118. Hashing module 122 may also be used as an input to the machine learning model. Hashing module 122 is used to anonymize user information while extracting features from text (e.g., emails). The hashed values are used to determine when/how to train the machine learning model. For example, an email of a user has various features that will be hashed. Features such as the senders' name, the date and time, urgency of the email, and other features are hashed and stored in hash value buckets. In some examples, one or more features of the email are hashed, but not all. In some examples, all of the features extracted from the email are hashed. For example, an email M5 is received. The received date is Feb. 12, 2021 with a subject line of "This is a test email" and the body of the email "I am writing this test email as an example @John, did you get it?" Email M5 also includes an attachment named "attach.docx" Based on the properties of email M5, a bitwise identifier for the email is determined. A bitwise identifier is determined based on the factors: read status, starred, follow-up, replied/forwarded, and @ mentions. If email M5 is unread, marked for follow-up, replied, and has the user @ mentioned, the binary value for email M5 is "10111", each bit representing a single property. Next hash values are calculated for various properties of the email. For email M5, a hash is calculated for subject, message, date, attachment, content of attachment as follows:

MD5 of Subject—52e47b64a767585259459dc748eb0365

MD5 of Message—ed5b6ba41d1d62db0207b80fdb82feca

MD5 of Date—ab92082f f726d84e70d66148077cd430

MD5 of "attach.doc"—797c54d772d76952fff51b70a1af2866

MD5 of attach.doc contents—c631dcc81dbc7ccfd6309dfc0608c423

The calculated hash values are all concatenated as: Hash of email—54c12b81209cffec0f087c04e5046434.

Additionally, the binary value for email M5 such as "10111" may also be hashed.

It is noted that MD5 is simply used for illustrative purposes and any other suitable hashing technique can be used to calculate the hash of the extracted features.

Next, the hash of the email is categorized into hash buckets by applying the mod operation to the hash of the email with the number of possible hash buckets (e.g., 200) such that: 54c12b81209cffec0f087c04e5046434 mod 200 (histogram size)=4. In some examples, the emails whose hashed features fall into the hash buckets will be used for personalizing the machine learning models once the hash buckets exceed a certain count (e.g., threshold of 5 emails).

The hash bucket for the received M5 email is 4. When the hash bucket includes a count of emails over a threshold (e.g., 5), the email is summarized and used for personalizing the machine learning model.

Each of the training data module 106, hashing module 122, machine learning model 118, and correspondence 108 may be communicably coupled together. The machine learning model 118 may be sent to client 102 (e.g., a user device, a virtual machine) for use at a client application (e.g., email application). Correspondence module 108 includes a repository of communication texts (e.g., emails and attachments). The communication texts found in correspondence module 108 may be forwarded to the client at the client 102 (e.g., user device), used for training purposes (e.g., with training data module 106), or simply stored for future use. Within the client 102 is a machine learning model 110 that includes sub-modules: compression module 112, summarization module 114, hashing module 116, and training module 120.

The compression module 112 may be maintained within a client application (e.g., machine learning model 110) on the client 102. The compression module is configured to provide a summary of an email and may operate as a standalone module separate from the machine learning module. The compression module may generate various versions of compressions (e.g., 25%, 35%, 45% compression) and provide the compressed versions of the email to the user device 102 for output to the user. In some examples, the personalized machine learning model 110 provides the compression module 112 an indication to generate a compressed version of the email at a 40% compression rate. In some examples, the compression module 112 functions as part of the personalized machine learning model 110. The output of the personalized machine learning model may include a compressed email.

The content provider server 104 may receive correspondence 108 to be forwarded to a user of the client 102. The received correspondence 108 may be used for training the machine learning model 118 and/or sent to client 102 for use with the personalized machine learning model 110.

Figure 2:
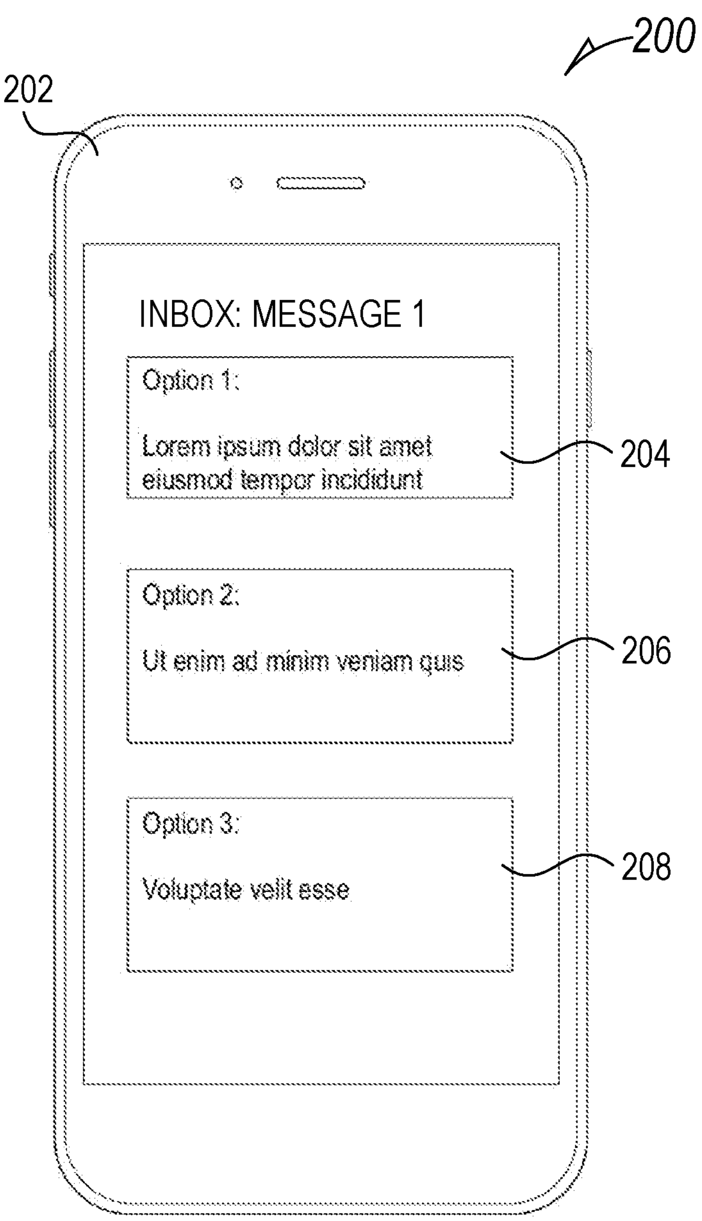
FIG. 2 illustrates an example user interface view of a client for generating a personalized compression system in accordance with some examples.

Content provider server 104 may provide the client 102 with a personalized machine learning model 110 that may be similar to the machine learning model 118. In some examples, the personalized machine learning model 110 is at first, a replica of the machine learning model 118 but over time, the personalized machine learning model 110 may be trained to become a personalized model for the user of the client 102. Personalized machine learning model 110 includes compression module 112, summarization module 114, and hashing module 116 that are similar to the modules found in machine learning model 118. Additionally, the personalized machine learning model 110 may include training module 120 that allows the personalized machine learning model 110 to be updated, or trained in place, on the client 102. FIG. 2 illustrates an example user interface view of a client device for generating a personalized compression system in accordance with some examples.

A system 200 includes a user device 202 (e.g., client 102, user device) that displays an email client with three options. The provided options are summaries (e.g., compressions) of an email with varying levels of compression. A first option 204 displays a compressed version of a received writing at a first length. A second option 206 displays a compressed version of the received writing at a second length, shorter than the first length shown in first option 204. A third option 208 displays a compressed version of the received writing at a third length shorter than either of the first and second options 204 and 206.

In some examples, the display of 202 is shown to a user during training to gather the user's specific preferences. In some examples, after training, the display only shows one compression.

Figure 3:
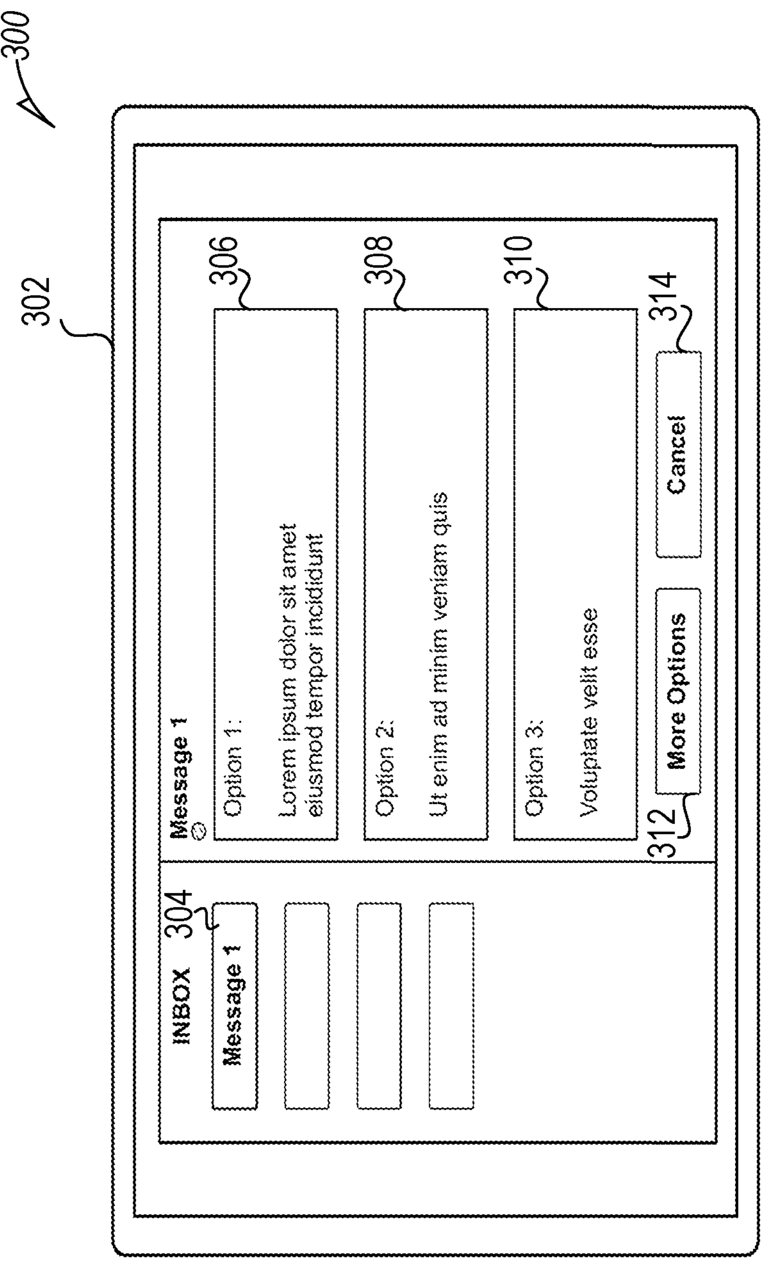
FIG. 3 illustrates an example user interface view of a computing device for generating a personalized compression system in accordance with some examples.

FIG. 3 illustrates an example user interface view of a computing device for generating a personalized compression system in accordance with some examples.

Web browser 300 displays an example email client 302 including a user's inbox with a message 304. The message 304 is expanded in a view displayed on the right side of the email client 302 with three options. The three options correspond to a compression of message 304. A first option 306 is a compressed message that has a first length. A second option 308 is a compressed message that has a second length. In some examples, the first length and the second length are different lengths. A third option 310 is a compressed message that has a third length. In some examples, each option has a different length. In some examples, there are more than 3 options displayed in the email client 302. In some examples, there are fewer than 3 options displayed in the email client 302.

Additionally, the email client 302 may display an icon 312 for more options. This icon 312, when selected, may provide one or more options including other email compression options of different lengths that are not currently displayed on email client 302. The email client 302 may also display an icon 314 to cancel. The cancellation option allows the user to exit the summarization view without selecting a compression option. In some examples, if the user selects the icon 314, the original message 304 is displayed in its entirety, without any compression.

Generating Baseline Model

Figure 4:
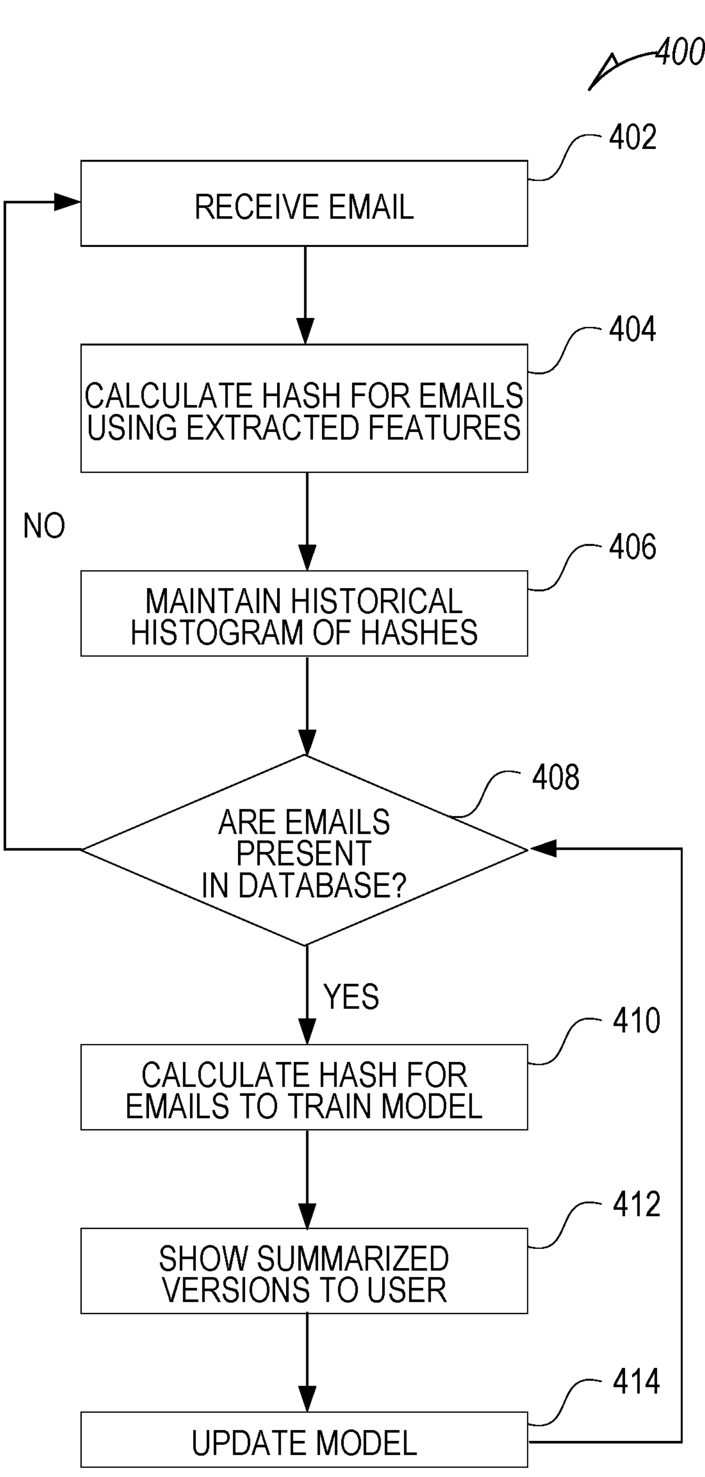
FIG. 4 illustrates a flow diagram for generating a personalized compression system in accordance with some examples.

FIG. 4 illustrates a flow diagram of an example system for creating a personalized compression system in accordance with some examples. FIG. 4 illustrates a process for training a baseline machine learning model including various user's inputs. Eventually, the trained baseline machine learning model is deployed to each user and updated at the user device into a personalized machine learning model.

It will be understood that any of methods 400, 500, and/or 600 may be performed by a device, such as a computing device. For instance, the operations of a method 400, 500, and/or 600 may be represented by executable instructions (e.g., machine learning model) that, when executed by a processor of a computing device, cause the computing device to perform the method 400, 500, and/or 600. Thus, an operation of the method 400, 500, and/or 600 may be performed by a hardware processor (e.g., central processing unit or graphics processing unit) of a computing device (e.g., desktop, server, etc.). Accordingly, the method 400, 500, and/or 600 is described below in reference to such a computing device.

Method 400 includes operations for collecting user preferences with minimal iterations for creating a personalized compression system. At operation 402, a computing device (e.g., 102) receives an email. The computing device utilizes a tool (automated or semi-automated) to summarize the received email (e.g., compression module 124). For the received email, operation 404 calculates a hash value for the emails using extracted features. For example, a received email includes features including one or more of: message length, message date, body of text from the email, sender, attachments, priority.

Various factors that are evaluated may include but are not limited to: i) user preferences, ii) user activity, and iii) message properties.

User Preferences

To determine whether an email is to be summarized, user preferences are factored into the determination. For example, a user may indicate that emails older than one month should be summarized and any emails received within the past month should not be summarized. In another example, a user may indicate that emails received from a specific person (e.g., supervisor) or department (e.g., human resources (HR)) should not be summarized.

User Activity

User activity is factored into the determination of whether an email is to be summarized. Such user activities may be determined based on received user inputs. For example, recently read emails are not summarized. A user may interact with the email and prefer not to have a summarized version. Another example includes determining that a user has searched for a key word or key terms found within the email. The email including the recently searched key word or key term will not be summarized.

Message Properties

Various properties of the received messages are used to determine whether the message is to be summarized. Properties such as the length of the message, message date, message from specific departments, messages with attachments, and others. For example, a long message would typically benefit from being summarized. Additionally, old emails that may not be essential may benefit the user from summarization. Essential emails may include recently received emails, emails from management personnel, emails from HR, or emails relating to an event or meeting occurring within a threshold time period (e.g., one day). Non-essential emails may include promotional materials, outdated emails, junk emails, and other emails deemed unimportant by the user.

For user preferences and user activity preferences, a score of 0 or 1 is assigned. For message properties, a logistic regression model is applied to generate a summarization score. A computed weight (e.g., w1, w2, s3) is given to each of the categories based on the user's preferences. The determination of whether an email is to be summarized can be calculated using the following equation:

$$\text{Score}=w1*\text{user preference score}+w2*\text{user activity score}+w3*\text{message property score}/(w1+w2+w3)$$

The user preference score and the user activity score is 0 or 1 and the message property score is based on a logistic regression model. If the score is above a threshold, the message is to be summarized. If the score is below the threshold, the message should not be summarized.

Various other features extracted from an email may include: number of words, sentences, paragraphs in the email; age of the email; whether the email contains frequently searched keywords; whether the email is from the user's top N contacts; whether the email is from a manager or higher up personnel in the user's organization; whether the email is sent as a group email to many recipients; whether the user is blind carbon copied on the email; whether the user is carbon copied on the email; whether email is an auto-generated email; whether the email is flagged from the sender; and/or whether the email is from a group administrator (e.g., human resources).

Additional processing including sentiment analysis may be performed on the received and extracted email to provide additional details about the email to the user.

For each email, a hash operation is performed on the extracted features of the email and the resulting hash values are stored in hash buckets. The hash buckets are used to update and maintain a historical histogram of the hashes at operation 406. In some examples, each hash bucket is labeled from 0 to N−1.

At operation 408, the computing device determines if emails are present in the database that have not yet been processed. If yes, at operation 410, features of the emails are extracted, hashed, and stored. At operation 410, the emails are also summarized for presenting to a user as part of training the machine learning model.

At operation 412, the summarized versions of the email (either received or stored in database) are provided to the user for selection. Based on a received indication of a selected summary (if any are selected), the model is updated at operation 414.

In some examples, operations of method 400 are performed iteratively to update the baseline machine learning model. In some other examples, the initial dataset for training the baseline machine learning model can be generated using the data pertaining to multiple users of an email client (e.g., Microsoft Outlook). Once the baseline machine learning model is deployed and available to all users, each user will have his/her own personal user activity which is used to update the baseline machine learning model to generate a personalized machine learning model for the specific user.

In an example, a training set includes N emails. For each email of the training set, a hash-value is generated for each email. Hash-values range from 0 to N−1. A global histogram of hash-values is generated to keep track of the number of emails corresponding to each hash-value. The hash-values are used to keep email data anonymized to ensure user's privacy. Each email and corresponding hash-value is used to generate a baseline machine learning model. Once the baseline machine learning model is generated, it is deployed to users to create personalized machine learning models. To do so, for each user, emails from the user's inbox are hashed, compressed (e.g., summarized) and provided to the user for selection. When the user makes a selection, the selected compression is used to update the machine learning model, leading to a personalized machine learning model that provides compressed emails based on the user's preferences.

Personalized Model

Figure 5:
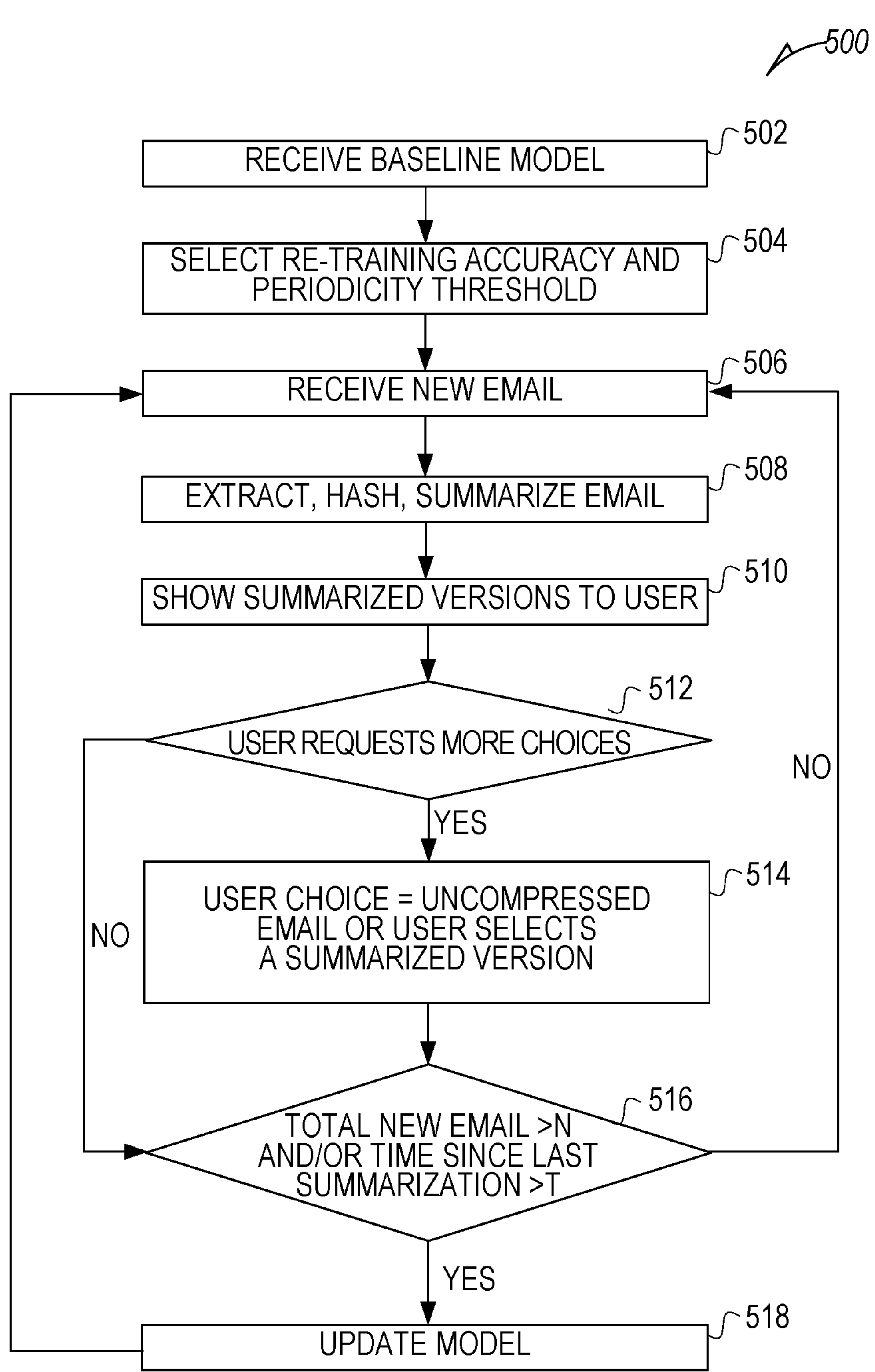
FIG. 5 illustrates a flow diagram for implementing a personalized compression system in accordance with some examples.

FIG. 5 illustrates a flow diagram of an exemplary system for implementing a personalized compression system in accordance with some examples. FIG. 5 describes the process for training a baseline machine learning model for use by a specific user.

It will be understood that the method 500 may be performed by a device, such as a computing device. For instance, the operations of a method 500 may be represented by executable instructions (e.g., machine learning model) that, when executed by a processor of a computing device, cause the computing device to perform the method 500. Thus, an operation of the method 500 may be performed by a hardware processor (e.g., central processing unit or graphics processing unit) of a computing device (e.g., desktop, server, etc.). Accordingly, the method 500 is described below in reference to such a computing device.

Method 500 includes operations for receiving and using a trained machine learning model (e.g., baseline model). Operation 502 proceeds at a client device (e.g., client 102) by receiving a baseline machine learning model. In some embodiments, the baseline machine learning model is the same machine learning model as the trained model in method 400. The user or administrator may select a re-training accuracy and periodicity threshold at operation 504.

At operation 506, the client device receives a new correspondence (e.g., email communication). After receiving new correspondence, the client device extracts, hashes, and summarizes the received new correspondence (e.g., new email) at operation 508. In some embodiments, operation 508 generates multiple summaries of different lengths of the new correspondence. The summarized version(s) of the new correspondence is shown to the user at operation 510.

After showing the user the summarized versions, if the user requests more choices at operation 512, the user may be provided with one or more summarized versions distinct from the displayed version. If the user makes a selection of the displayed summaries, the selected summary is used to update the model at operation 518. If the user does not request more choices at operation 512, the method 500 proceeds to operation 516 where the client device determines whether the total number of new emails exceeds a threshold number of emails and/or if a time since the last summarization of emails exceeds a threshold period of time. In some examples, if the user chooses an option for the uncompressed email or the user selects a summarized version at operation 514, at operation 516, the client device determines whether the total number of new emails exceeds a threshold number and/or a time since the last summarization of emails exceeds a threshold time. If yes on either or both counts, the baseline model is updated at operation 518. After the baseline model is updated at operation 518, the method 500 may repeat the steps of 506-518 as needed. Additionally, and/or alternatively, each and every one of the distinct operations of method 500 may be repeated or performed independently.

In some examples, an alternate flow of method 500 is used to implement a personalized compression system. A client device receives a baseline machine learning model and a writing. The baseline machine learning model generates at least two summaries of the writing. Each of the at least two summaries are of different lengths (e.g., compression rates). The at least two summaries are ranked based on the factors described in FIG. 4. The summaries are provided to the user in their ranked order and a selection of one of the summaries is received. Based on the selection, the baseline machine learning model is modified into a personalized machine learning model. A second writing is received and based on an extracted feature of the second writing and based on the personalized machine learning model, the personalized machine learning model generates at least two new summaries for the second writing. For each of the new summaries, a relevance score is calculated. Based on the calculated relevance score, the summary with the highest relevance score is provided to the user. After summarization, the original writing may be deleted/removed from the memory on the client device.

In some examples, the personalized machine learning model is different for a user based on the electronic device that the user is using. For example, a user has a personalized machine learning model that provides summaries at a lower compression rate on the user's computer (e.g., laptop) but a different personalized machine learning model that provides summaries at a high compression rate for emails being displayed on the user's mobile device (e.g., cell phone). One user may have several personalized machine learning models based on a number of electronic devices the user is using.

Figure 6:
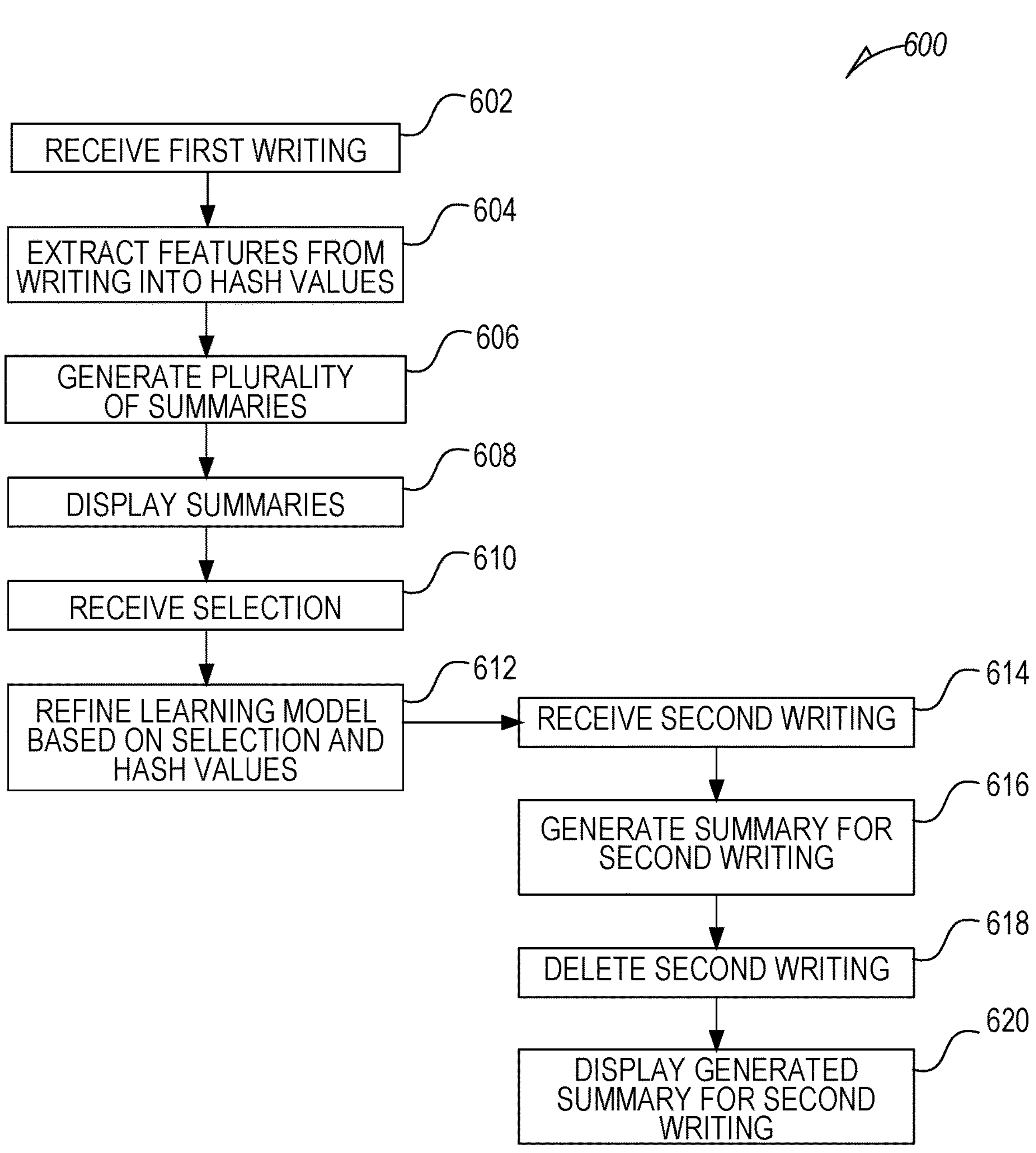
FIG. 6 illustrates a flow diagram for generating and implementing a personalized compression system in accordance with some examples.

FIG. 6 is a flow diagram describing the method for creating and implementing a personalized compression system in accordance with some examples.

Method 600 begins at operation 602, a computing device receives a first writing.

At operation 604, a computing device extracts features from the writing into hash values.

At operation 606, the computing device generates a plurality of summaries (e.g., at least two summaries) for the first writing. In some examples, each summary of the plurality of summaries has a different length. For example, in a plurality of 4 generated summaries, a first summary has a length 20% of the original received writing. The second summary has a length 40%, the third has a length 60%, the fourth has a length 80% of the original received writing.

In some examples, generating the plurality of summaries for the first writing includes providing the hash value or values of the first writing to the baseline machine learning model as inputs and computing a determination of whether the first writing is to be summarized. In accordance with a determination that the first writing is to be summarized, the computing device uses the baseline machine learning model to generate the set of summaries. For example, a first writing is received by a user from the user's boss. The baseline machine learning model is configured to recognize when an email is received from a user's superior, the email is not to be summarized. In such a scenario, the baseline machine learning model does not provide summaries of the received email but instead displays the message in its entirety. Additionally, as the received email is not summarized, the received email in its entirety, is stored on the client device.

In some examples, the computing device selects a priority group of summaries that includes fewer than all summaries of the plurality of summaries, based on the baseline machine learning model. In some examples, selecting the priority group of summaries includes receiving, from the baseline machine learning model, an indication of a preferred summary length and selecting summaries of the plurality of summaries having the preferred summary length for the priority group of summaries. For example, the baseline machine learning model indicates that users typically prefer a summary with a compression rate of 45%. The priority group of summaries will include summaries within a range of the 45% compression rate.

In some examples, the computing device assigns a relevance score to each of the summaries of the plurality of summaries. The relevance scores are calculated based on a previous selection of a summary of that length, user account metadata, device capability, and other factors. In some examples, the relevance scores are used to determine a priority group of summaries as discussed above.

In some examples, the computing device receives a supplementary writing along with the first writing. The supplementary writing may be an attachment document. The computing device in some examples generates a second plurality of summaries for the supplementary writing. In some embodiments, the second plurality of summaries includes at least two or more summaries. The second plurality of summaries for the supplementary writing being distinct from the summaries for the first writing and each summary of the second plurality of summaries having a different length. For example, a word document is sent as an attachment to an email. The email (e.g., first writing) is summarized and the word document (e.g., supplementary writing) is also summarized. The summaries for the email and for the word document are separate summaries. In some examples, the computing device provides a concatenated summary for display. The concatenated summary may include the summary of the first writing and the supplementary writing.

In some examples, when displaying the summary of the first writing and/or the supplementary writing, the first writing and the supplementary writing are not provided for displayed. Additionally, in some examples, the first writing and the supplementary writing may be removed or deleted from the client device. The summaries are shorter and are stored on the client device. In this way, the summaries are stored on the client device in lieu of the original to save on storage on the client device.

At operation 608, the computing device displays one or more of the plurality of generated summaries.

At operation 610, the computing device receives, from a user, a selection. In some examples, the selection is of one of the displayed plurality of summaries. In some examples, the selection is a request to display more summaries.

At operation 612, the computing device uses the received selection to refine the baseline learning model. Additionally, the refining may include the hash values extracted from the first writing. In some examples, the baseline machine learning model is refined by assigning a top relevance score to the user selected summary, assigning a middle relevance score to summaries having a length within a specified range surrounding the length of the selected summary and assigning a low relevance score to remaining summaries outside of the specified range. For example, the selected summary is assigned a relevance score of HIGH, the summaries within +/−20% of the selected summary is assigned a relevance score of MEDIUM, and the summaries that are outside of the +/−20% range is assigned a relevance score of LOW. The relevance scores are used as inputs to refining the machine learning model. In some examples, each generated summary is assigned a relevance score.

In some examples, the computing device determines that the received first writing from operation 602 is part of a string of writings (e.g., email chain). The computing device then generates multiple sets (e.g., pluralities) of summaries corresponding to each writing of the string of writings and provides the set of summaries for displaying on the device. Each summary for the string of writings may be generated with the same compression rate (e.g., 45%) and be displayed to the user in a user interface akin to a chat box.

At operation 614, the computing device receives a second writing.

At operation 616, the computing device generates a summary for the second writing. In some examples, the computing device generates a second plurality of summaries (e.g., two or more summaries) for the second writing. The second plurality of summaries have a length within a predefined percentage range of the selected summary of the first writing.

In some examples, the computing device receives a second supplementary writing along with the second writing. The first writing, the supplementary writing, the second writing, and the second supplementary writing are distinct writings. The computing device generates, using the personalized machine learning model, a summary for the second writing having a length the same or substantially the same (e.g., within a tolerance of +/−10%) as the length of the selected summary for the first writing. The computing device also generates, using the personalized machine learning model, a summary for the second supplementary writing using the same length or substantially the same (e.g., within a tolerance of +/−10%) as the length of the selected summary for the first writing. The generated summaries for the second writing and the second supplementary writing are provided.

At operation 618, the computing device deletes the second writing from the computing device. In some examples, the computing device also deletes the received second supplementary writing from the computing device.

At operation 620, the computing device displays the generated summary and/or summaries for the second writing. In some examples, the computing device receives, from the user, an indication of a second selection based on the displayed summaries.

It is understood that in some examples, the second writing is not provided to the user. The summary of the second writing may be provided to the user as a result of the trained, personalized machine learning model. In some examples, if further training is required or necessitated, the second writing and subsequent summaries may be used as training inputs for the personalized machine learning model.

Figure 7:
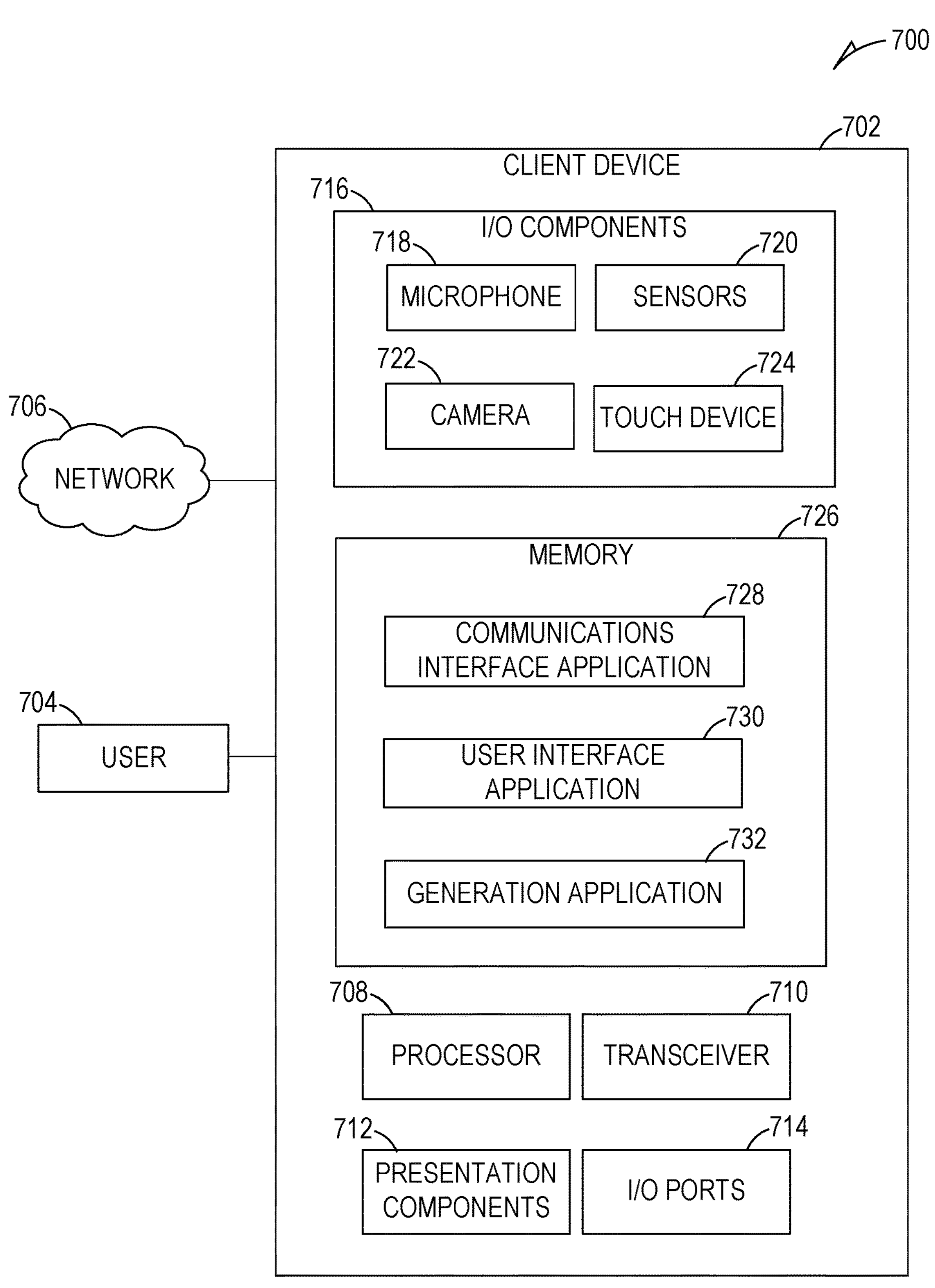
FIG. 7 illustrates a block diagram of an example networked system depicting an environment in which examples may operate.

FIG. 7 depicts a block diagram that illustrates an example environment 700 including client device 702 for collecting and providing user and environment data. In some examples, the client device 702 has at least one processor 708, a transceiver 710, one or more presentation components 712, one or more input/output I/O ports 714, transceiver 710, and a memory 726. The client device 702 may take the form of a mobile computing device or any other portable device, such as, a mobile telephone, laptop, tablet, computing pad, notebook, gaming device, portable media player, etc. The client device 102 may also include less portable devices such as desktop personal computers, kiosks, tabletop devices, industrial control devices, etc. Other examples may incorporate the client device 702 as part of a multi-device system in which two separate physical devices share or otherwise provide access to the illustrated components of the computing device 702.

The processor 708 may include any quantity of processing units and is programmed to execute computer-executable instructions for implementing aspects of the disclosure. The instructions may be performed by the processor or by multiple processors within the computing device or performed by a processor external to the computing device. In some examples, the processor 708 is programmed to execute methods such as the ones illustrated in accompanying FIGS. 4-6.

Additionally, or alternatively, some examples may make the processor 708 programmed to present an experience in a user interface ("UI"), e.g., the UI shown in FIGS. 2-3. Moreover, in some examples, the processor 708 may represent an implementation of techniques to perform the operations described herein.

The transceiver 710 is an antenna capable of transmitting and receiving radio frequency ("RF") signals. One skilled in the art will appreciate and understand that various antenna and corresponding chipsets may be used to provide communicative capabilities between the client device 702 and other remote devices. Examples are not limited to RF signaling, however, as various other communication modalities may alternatively be used.

The presentation components 712 visibly or audibly present information on the client 102. Examples of presentation components 712 include, without limitation, computer monitors, televisions, projectors, touch screens, phone displays, tablet displays, wearable device screens, televisions, speakers, vibrating devices, and any other devices configured to display, verbally communicate, or otherwise indicate image search results to a user. In some examples, the client device 702 may be a smart phone or a mobile tablet that includes speakers capable of playing audible search results to the user. In other examples, the client device 702 is a computer in a car that audibly presents search responses through a car speaker system, visually presents search responses on display screens in the car, e.g., situated in the car's dashboard, within headrests, on a drop-down screen, or the like, or a combination thereof. Other examples may present the disclosed search responses through various other display or audio presentation components 712.

I/O ports 714 allow the client device 702 to be logically coupled to other devices and I/O components 716, some of which may be built into client device 702 while others may be external. Specific to the examples discussed herein, I/O components 716 include a microphone 718, one or more sensors 720, a camera 722, and a touch device 724. The microphone 718 captures speech from the user 704 and/or speech of or by the user 704. The sensors 720 may include any number of sensors on or in a mobile computing device, electronic toy, gaming console, wearable device, television, vehicle, or other computing device 702. Additionally, the sensors 720 may include an accelerometer, magnetometer, pressure sensor, photometer, thermometer, global positioning system ("GPS") chip or circuitry, bar scanner, biometric scanner for scanning fingerprint, palm print, blood, eye, or the like, gyroscope, near-field communication ("NFC") receiver, or any other sensor configured to capture data from the user 704 or the environment. The camera 722 captures images or video of the user 704. The touch device 724 may include a touchpad, track pad, touch screen, or other touch-capturing device. The illustrated I/O components 716 are but one example of I/O components that may be included on the client device 702. Other examples may include additional or alternative I/O components 716, e.g., a sound card, a vibrating device, a scanner, a printer, a wireless communication module, or any other component for capturing information related to the user or the user's environment.

The memory 726 includes any quantity of memory associated with or accessible by the computing device 702. The memory 726 may be internal to the client 102, as shown in FIG. 7, external to the client 102, not shown in FIG. 7, or both. Examples of memory 726 may include, without limitation, random access memory (RAM), read only memory (ROM), electronically erasable programmable read only memory (EEPROM), flash memory or other memory technologies, CDROM, digital versatile disks (DVDs) or other optical or holographic media, magnetic cassettes, magnetic tape, magnetic disk storage or other magnetic storage devices, memory wired into an analog computing device, or any other medium for encoding desired information and for access by the client 102. The terms computer-readable medium, machine readable medium, and storage device do not include carrier waves to the extent carrier waves are deemed too transitory. Memory 726 may also take the form of volatile and/or nonvolatile memory; may be removable, non-removable, or a combination thereof; and may include various hardware devices, e.g., solid-state memory, hard drives, optical-disc drives, etc. Additionally, or alternatively, the memory 726 may be distributed across multiple client devices 702, e.g., in a virtualized environment in which instruction processing is carried out on multiple clients 102. The memory 726 stores, among other data, various device applications that, when executed by the processor 708, operate to perform functionality on the client 102. Examples of applications may include search applications, instant messaging applications, electronic-mail application programs, web browsers, calendar application programs, address book application programs, messaging programs, media applications, location-based services, search programs, and the like. The applications may communicate with counterpart applications or services such as web services accessible via the network 706. For example, the applications may include client-operating applications that correspond to server-side applications executing on remote servers or computing devices in the cloud.

Specifically, instructions stored in memory 726 comprise a communications interface application 728, a user interface application 730, and a compression application 732. In some examples, the communications interface application 728 includes computer-executable instructions for operating a network interface card and/or a driver for operating the network interface card. Communication between the client device 702 and other devices may occur using any protocol or mechanism over a wired or wireless connection, or across the network 706. In some examples, the communications interface application 728 is operable with RF and short-range communication technologies using electronic tags, such as NFC tags, Bluetooth® brand tags, or the like.

In some examples, the user interface application 730 includes a graphics application for displaying data to the user and receiving data from the user. The user interface application 730 may also include computer-executable instructions for operating the graphics card to display search results and corresponding images or speech on or through the presentation components 712. The user interface application 730 may also interact with the various sensors 720 and camera 722 to both capture and present information through the presentation components 712.

Figure 8:
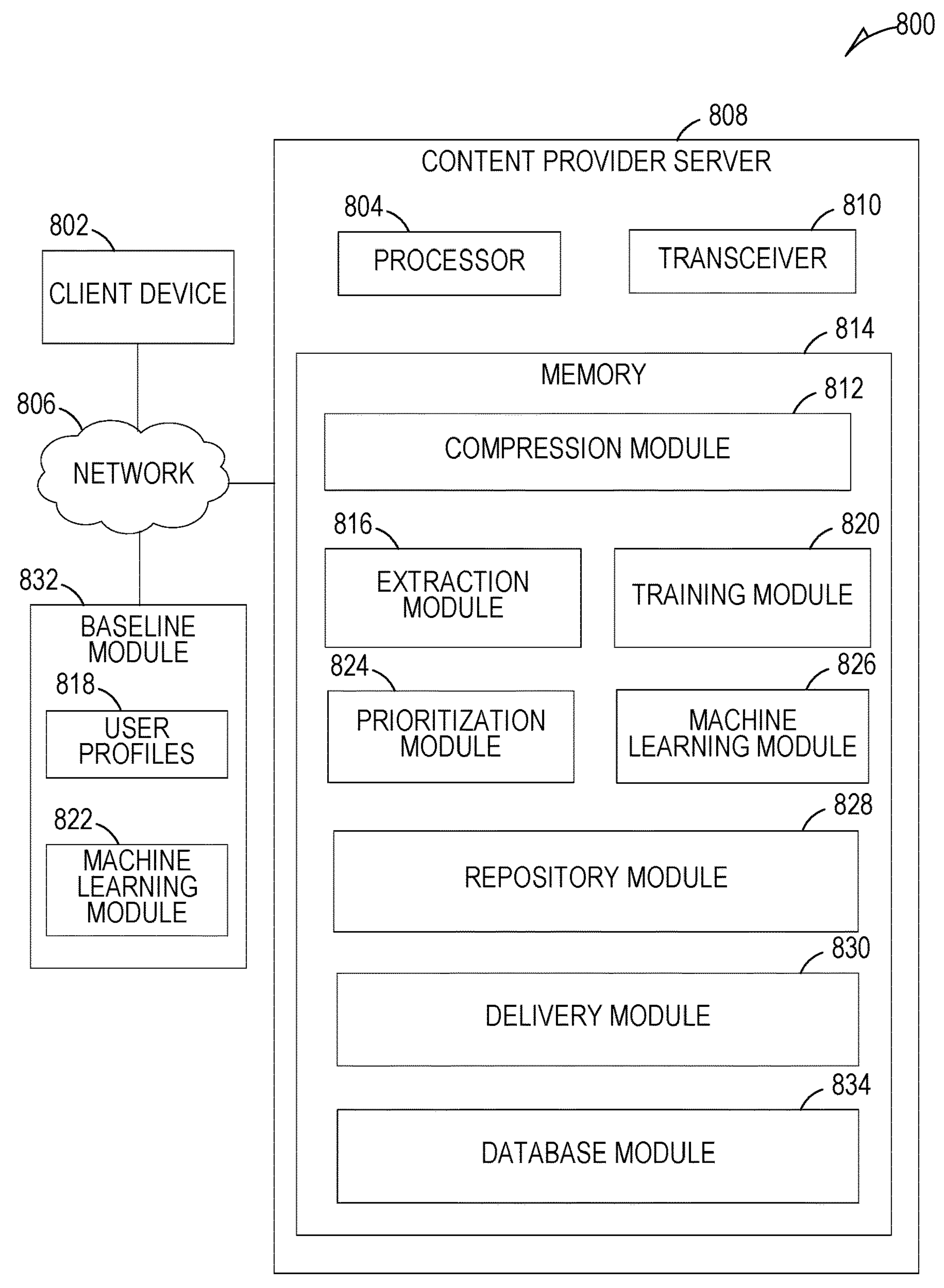
FIG. 8 illustrates a block diagram of a computer system to implement one or more examples.

FIG. 8 is a block diagram of a networking environment 800 for providing image search results and recommendations on client device(s) 802. The networking environment 800 may include multiple client devices 802, or just one as shown in FIG. 1, a content provider server 808 communicating over a network 806. In some examples, user and environment data are communicated by the client devices 802 over the network 806 to the content provider server 808 and the content provider server 808 sends baseline machine learning models that are provided back to the client devices 802 for personalization and use on the client device for their respective users.

The networking environment 806 shown in FIG. 8 is merely an example of one suitable computing system environment and is not intended to suggest any limitation as to the scope of use or functionality of examples disclosed herein. Neither should the illustrated networking environment 800 be interpreted as having any dependency or requirement related to any single component, module, index, or combination thereof.

The network 806 may include any computer network, for example the Internet, a private network, local area network (LAN), wide area network (WAN), or the like. The network 806 may include various network interfaces, adapters, modems, and other networking devices for communicatively connecting the client devices 802 and the content provider server 808. The network 806 may also include configurations for point-to-point connections. Computer networks are well known to one skilled in the art, and therefore do not need to be discussed in detail herein.

The client devices 802 may be any type of client device discussed above in reference to FIG. 1. Each client device 802 may capture user and/or environment data from their respective users and communicate the captured user and environment data over the network 806 to the content provider server 808. To do so, each device may be equipped with a communications interface application 728, as discussed above in reference to FIG. 7. In response, the content provider server 808 may be capable of providing recorded gameplay streams to many client devices 802 capable of communicating their respectively captured user and environment data over the network 806.

The client device 802 may be equipped with various software applications and presentation components 712 for receiving baseline machine learning algorithms and/or correspondence. For example, a mobile phone may receive a copy of a baseline machine learning algorithm that has been pre-trained on various user's compression preferences. The baseline machine learning algorithm is updated into a personalized machine learning algorithm for use on a client device 802 based on a user's preference. Many different variations of client devices 802 and presentation techniques may be used to deliver the machine learning model and/or various correspondences (e.g., emails).

The content provider server 808 represents a server or collection of servers configured to execute different web-service computer-executable instructions. The content provider server 808 includes a processor 804 to process executable instructions, a transceiver 810 to communicate over the network 806, and a memory 814 embodied with at least the following executable instructions: compression module 812, extraction module 816, training module 820, prioritization module 824, machine learning module 826, personalization module 828, and learning module 830. While content provider server 808 is illustrated as a single box, one skilled in the art will appreciate that the content provider server 808 may, in fact, be scalable. For example, the content provider server 808 may include multiple servers operating various portions of software that collectively generate overlay streams for display on the client devices 802.

The compression module 812 generates compressed summaries of writings for presentation to a client device. Extraction module 816 extracts various data from writings and processes the extracted values into hash values to protect the content of the writings. The hash values are also maintained in a histogram that is referred to when determining when/if to update the machine learning model. Training module 820 is used to train machine learning module 826 using various inputs including emails from users of an email client (e.g., Microsoft Outlook). Prioritization module 824 may be used to prioritize the generated summaries from compression module 812 into a select priority group that is presented to the user. Additionally, prioritization module 824 may be used to assign relevance scores to the summaries selected by the user. The preferred, or selected summaries are given a higher score, or weight and this input is used to refine the presented summaries for future writings. Personalization module 828 may include Machine Learning module 826, training module 820, prioritization module 824, extraction module 816, and compression module 812. Personalization module 828 is an updated version of the baseline machine learning module (e.g., 118, FIG. 1). Also, networking environment 800 depicts the database 834 as a collection of separate modules of the content provider server 808. However, examples may actually store the discussed Web, user, and environment data shown in the database 834 on the content provider server 808.

Baseline module 832 includes user profiles 818 and machine learning module 822. Herein, a "user profile" refers to an electronically stored collection of information related to the user. Such information may include the user's name, age, gender, height, weight, demographics, current location, residency, citizenship, family, friends, schooling, occupation, hobbies, skills, interests, Web searches, health information, birthday, anniversary, celebrated holidays, moods, user's condition, and any other personalized information associated with the user. The user profile includes static profile elements, e.g., name, birthplace, etc., and dynamic profile elements that change over time, e.g., residency, age, condition, etc. The user profile may be built through probing questions to the user or through analyzing the user's behavior on one or more client devices.

Additionally, user profiles 818 may include static and/or dynamic data parameters for individual users. Examples of user profile data include, without limitation, a user's age, gender, race, name, location, interests, Web search history, social media connections and interactions, purchase history, routine behavior, jobs, or virtually any unique data points specific to the user. The user profiles 818 may be expanded to encompass various other aspects of a user's life.

Machine learning module 822 may include one or more variants of baseline machine learning models. For example, a first baseline machine learning model is for use on a mobile device (e.g., client device 802) and a second baseline machine learning model is for use on a desktop device (e.g., desktop computer). Based on the technical characteristics and capabilities of the device, different machine learning models may be implemented. A mobile device such as a cell phone device may implement a machine learning model that is distinct from a desktop computer. Additionally, a cloud-based client such as a virtual client or virtual machine may also implement a machine learning model described herein.

The present disclosure relates to systems and methods for providing a personalized communication text compression system according to at least the examples provided in the sections below:

(A1) In one aspect, some examples or examples include a method performed by a client device (e.g., client 102) in data communication with a network (e.g., network 706).

The method includes: receiving a first writing (e.g., 602) and extracting features from the first writing into hash values (e.g., 604). The method further includes generating (e.g., 606), with a baseline machine learning model (e.g., 118), a plurality of summaries for the first writing, each summary having a different length and causing display (e.g., 608) of at least one summary of the plurality of summaries on the client device. The client device receives an indication of a selection based on the displayed summary or summaries (e.g., 610) and the baseline machine learning model is refined based on the hash values and the selection resulting in a personalized machine learning model.

(A2) In some examples of A1, the method includes receiving a second writing (e.g., 614) and generating a summary (e.g., 616) for the second writing having a same length as the selected summary of the first writing. For example, a user selects a 70% compressed summary of a first writing. The personalized machine learning model, for the second writing, generates a summary at the same 70% compression rate. The method includes deleting the second writing from memory on the client device (e.g., 618) and displaying the generated summary for the second writing on the client device.

(A3) In some examples of A1-A2, the method includes, after receiving the second writing, generating a second plurality of summaries (e.g., 616) for the second writing, the second plurality of summaries having a length within a predefined percentage range of the selected summary of the first writing. The method further includes providing the second plurality of summaries for displaying on the client device and receiving, from the user of the client device, an indication of a second selection based on the displayed at least one of the second plurality of summaries.

(A4) In some examples of A1-A3, the method includes, selecting, (e.g., 606) with the baseline machine learning model, a priority group of summaries that includes fewer than all summaries of the plurality of summaries. Causing display (e.g., 608) of the at least one summary of the plurality of summaries on the client device includes causing display of the priority group of summaries on the client device.

(A5) In some examples of A1-A4, the method includes receiving, from the baseline machine learning model, an indication of a preferred summary length and selecting summaries (e.g., 606 and 608) of the plurality of summaries having the preferred summary length as being the summaries of the priority group of summaries.

(A6) In some examples of A1-A5, the method includes receiving a supplementary writing, the supplementary writing being an attachment document, and generating, with the baseline machine learning model, a second plurality of summaries for the supplementary writing, each summary of the second plurality of summaries having a different length; providing, for display, the second plurality of summaries for the supplementary writing; and receiving, from the user of the client device, an indication of a second selection based on the displayed at least one of the second plurality of summaries for the supplementary writing.

(A7) In some examples of A1-A6, the method includes providing a concatenated summary for displaying on the client device, the concatenated summary including a summary of the first writing and a summary of the supplementary writing.

(A8) In some examples of A1-A7, causing display of the at least one summary of the second plurality of summaries on the client device (e.g., operation 620) further includes causing display of the at least one summary of the second plurality of summaries without providing the supplementary writing.

(A9) In some example of A1-A8, causing display of the at least one summary of the second plurality of summaries on the client device further includes causing display of the at least one summary of the second plurality of summaries without providing the supplementary writing.

(A10) In some example of A1-A9, the method includes providing the hash value of the first writing to the baseline machine learning model (e.g., 604), computing, by the baseline machine learning model whether the first writing is to be summarized where generating the plurality of summaries for the first writing is based on a determination that the first writing is to be summarized.

(A11) In some example of A1-A10, the method includes assigning a relevance score to each of the summaries of the plurality of summaries, the relevance score being calculated by previous selection of summary of that length, user account metadata, or device capability.

(A12) In some example of A1-A11, the method includes assigning a top relevance score to the selected summary, assigning a middle relevance score to summaries having a length within a specified range surrounding the length of the selected summary, and assigning a low relevance score to remaining summaries outside of the specified range.

(A13) In some example of A1-A12, the method includes determining the first writing is part of a string of writings, generating multiple pluralities of summaries for the string of writings, and providing the plurality of summaries for displaying on the client device.

(B1) In one aspect, some examples or examples include a computer system (e.g., 808) including one or more processors (e.g., 804) and memory (e.g., 814) storing computer-executable instructions that, when executed, cause the one or more processors to perform operations of: receiving a first writing, extracting features from the first writing into hash values, generating, with a baseline machine learning model stored at the client, a plurality of summaries for the first writing, each summary of the plurality of summaries having a different length, causing display of at least one summary of the plurality of summaries at the client, in response to the displayed at least one summary, receiving input indicating a selection, and refining the baseline machine learning model based on the hash values and the selection resulting in a personalized machine learning model.

(B2) In some examples of B1, the computer system further includes operations for receiving a second writing, generating, with the personalized machine learning model, a summary for the second writing having a length of the selected summary of the first writing, deleting the second writing from memory of the client, and causing display of the generated summary for the second writing at the client.

(B3) in some examples of B1-B2, the operations of the computer system further including receiving a second writing, generating a second plurality of summaries for the second writing, the second plurality of summaries having a length within a predefined percentage range of the selected summary of the first writing, providing, for display, the second plurality of summaries for displaying at the client, and in response to the displayed second plurality of summaries, receiving, input indicating a second selection.

(B4) In some examples of B1-B3, the client is a client device or a virtual client.

(C1) In one aspect, some examples or examples include a non-transitory computer readable storage medium storing one or more programs, the one or more programs comprising instructions which when executed by one or more processors of an electronic device, cause the electronic device to perform one or more operations comprising: receiving a first writing, extracting features from the first writing into hash values, generating, with a baseline machine learning model stored at the client, a plurality of summaries for the first writing, each summary of the plurality of summaries having a different length, causing display of at least one summary of the plurality of summaries at the client, in response to the displayed at least one summary, receiving input indicating a selection, and refining the baseline machine learning model based on the hash values and the selection resulting in a personalized machine learning model.

(C2) In some examples of C1, the storage medium includes operations for receiving a second writing, generating, with the personalized machine learning model, a summary for the second writing having a length of the selected summary of the first writing, deleting the second writing from memory of the client, and causing display of the generated summary for the second writing at the client.

(C3) In some examples of C1-C2, the storage medium includes operations for receiving a second writing, generating a second plurality of summaries for the second writing, the second plurality of summaries having a length within a predefined percentage range of the selected summary of the first writing, providing, for display, the second plurality of summaries for displaying at the client, and in response to the displayed second plurality of summaries, receiving, input indicating a second selection.

In yet another aspect, a system, comprising: a processor; and a memory device coupled to the processor and having a program stored thereon for execution by the processor to perform operations comprising any of the methods of A1-A13 described above. In yet another aspect, a computer-readable storage medium storing one or more programs for execution by one or more processors to perform operations comprising any of the methods of A1-A13 described above.

Although a few examples have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other examples may be within the scope of the following claims.

In the description herein, reference is made to the accompanying drawings that form a part hereof, and in which is shown by way of illustration specific examples which may be practiced. These examples are described in sufficient detail to enable those skilled in the art to practice the invention, and it is to be understood that other examples may be utilized and that structural, logical and electrical changes may be made without departing from the scope of the present invention. The included description of example examples is, therefore, not to be taken in a limited sense, and the scope of the present invention is defined by the appended claims.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

The invention claimed is:

1. A computer implemented method performed by a client, comprising:

receiving a first writing;

extracting features from the first writing into hash values;

generating, with a baseline machine learning model stored on the client, a plurality of summaries for the first writing, each summary of the plurality of summaries having a different length;

causing display of at least one summary of the plurality of summaries at the client;

in response to the displayed at least one summary, receiving input indicating a selection of one of the plurality of summaries, the selected summary having a first length;

refining the baseline machine learning model based on the hash values and the selected summary resulting in a personalized machine learning model;

receiving a second writing;

generating, with the personalized machine learning model, a summary for the second writing having the first length of the selected summary of the first writing;

deleting the second writing from memory of the client; and causing display of the generated summary for the second writing at the client.

2. The computer implemented method of claim 1, further comprising:

selecting, with the baseline machine learning model, a priority group of summaries that includes fewer than all summaries of the plurality of summaries, wherein causing display of the at least one summary of the plurality of summaries on the client comprises causing display of the priority group of summaries.

3. The computer implemented method of claim 2, wherein selecting the priority group of summaries further comprises:

receiving, from the baseline machine learning model, an indication of a preferred summary length; and selecting summaries of the plurality of summaries having the preferred summary length as being the summaries of the priority group of summaries.

4. The computer implemented method of claim 1, wherein generating the plurality of summaries for the first writing further comprises:

providing at least one hash value associated with the first writing to the baseline machine learning model; and computing, by the baseline machine learning model whether the first writing is to be summarized based in part on the hash value;

wherein generating the plurality of summaries for the first writing is based on a determination that the first writing is to be summarized.

5. The computer implemented method of claim 1, further comprising:

assigning a relevance score to each of the summaries of the plurality of summaries, the relevance score being calculated by:

comparing a length of each summary to the first length of the selected summary, user account metadata, or client capability.

6. The computer implemented method of claim 1, wherein refining the baseline machine learning model to generate a personalized machine learning model further comprises:

assigning a top relevance score to the selected summary;

assigning a middle relevance score to summaries having a length within a specified range surrounding the length of the selected summary; and assigning a low relevance score to remaining summaries outside of the specified range.

7. The computer implemented method of claim 1, further comprising:

determining that the first writing and the second writing are part of a string of writings;

generating multiple pluralities of summaries for each writing in the string of writings; and displaying one or more summaries of the multiple pluralities of summaries at the client.

8. A computer implemented method performed by a client, comprising:

receiving a first writing;

extracting features from the first writing into hash values;

generating, with a baseline machine learning model stored on the client, a plurality of summaries for the first writing, each summary of the plurality of summaries having a different length;

causing display of at least one summary of the plurality of summaries at the client;

in response to the displayed at least one summary, receiving input indicating a selection of one of the plurality of summaries, the selected summary having a first length;

receiving a second writing;

generating a second plurality of summaries for the second writing, the second plurality of summaries each having a second length within a predefined percentage range of the first length of the selected summary of the first writing;

providing, for display, the second plurality of summaries for displaying at the client; and in response to the displayed second plurality of summaries, receiving, input indicating a second selection.

9. A computer implemented method performed by a client, comprising:

receiving a first writing;

extracting features from the first writing into hash values;

generating, with a baseline machine learning model stored on the client, a plurality of summaries for the first writing, each summary of the plurality of summaries having various lengths;

causing display of at least one summary of the plurality of summaries at the client;

in response to the displayed at least one summary, receiving input indicating a selection of one of the plurality of summaries, the selected summary having a first length;

refining the baseline machine learning model based on the hash values and the selected summary resulting in a personalized machine learning model;

receiving a first supplementary writing, the first supplementary writing being an attachment document;

generating, with the baseline machine learning model, a second plurality of summaries for the first supplementary writing, each summary of the second plurality of summaries having various lengths:

providing, for display, the second plurality of summaries for the first supplementary writing; and in response to the displayed second plurality of summaries for the first supplementary writing, receiving input indicating a second selection of one of the second plurality of summaries, the second selected summary having a second length;

receiving a second writing and a second supplementary writing, each of the second writing and the second supplementary writing being distinct from the first writing and the supplementary writing;

generating, with the personalized machine learning model, a summary for the second writing having the same first length as the first length of the selected summary of the first writing;

generating, with the personalized machine learning model, a summary for the second supplementary writing having the same second length as the second length of the selected summary of the first supplementary writing;

deleting both the second writing and the second supplementary writing from memory of the client; and causing display of the generated summary for the second writing and the generated summary for the second supplementary writing at the client.

10. The computer implemented method of claim 9, further comprises providing a concatenated summary for displaying on the client, the concatenated summary including a summary of the first writing and a summary of the supplementary writing.

11. The computer implemented method of claim 9, wherein causing display of the at least one summary of the second plurality of summaries at the client further comprises causing display of the at least one summary of the second plurality of summaries without providing the supplementary writing.

12. A computer system, comprising:

one or more processors; and a memory storing computer-executable instructions that, when executed, cause the one or more processors to perform operations of:

receiving a first writing;

extracting features from the first writing into hash values;

generating, with a baseline machine learning model stored at a client, a plurality of summaries for the first writing, each summary of the plurality of summaries having a different length;

causing display of at least one summary of the plurality of summaries at the client;

in response to the displayed at least one summary, receiving input indicating a selection of one of the plurality of summaries, the selected summary having a first length;

refining the baseline machine learning model based on the hash values and the selected summary resulting in a personalized machine learning model;

receiving a second writing;

generating, with the personalized machine learning model, a summary for the second writing having the first length of the selected summary of the first writing;

deleting the second writing from memory of the client; and causing display of the generated summary for the second writing at the client; and refining the baseline machine learning model based on the hash values and the selection resulting in a personalized machine learning model.

13. A computer readable storage medium excluding signals storing one or more programs, the one or more programs comprising instructions which when executed by one or more processors of an electronic device, cause the electronic device to perform one or more operations comprising:

receiving a first writing;

extracting features from the first writing into hash values;

generating, with a baseline machine learning model stored at the client, a plurality of summaries for the first writing, each summary of the plurality of summaries having a different length;

causing display of at least one summary of the plurality of summaries at the client;

in response to the displayed at least one summary, receiving input indicating a selection;

refining the baseline machine learning model based on the hash values and the selection resulting in a personalized machine learning model;

receiving a second writing;

generating a second plurality of summaries for the second writing, the second plurality of summaries each having a second length within a predefined percentage range of the first length of the selected summary of the first writing;

providing, for display, the second plurality of summaries for displaying at the client; and in response to the displayed second plurality of summaries, receiving, input indicating a second selection.

* * * * *